June 20, 1961 — M. A. BRENNER ET AL — 2,989,666
SELECTIVE CONTROL VALVE
Original Filed June 9, 1955 — 2 Sheets-Sheet 1
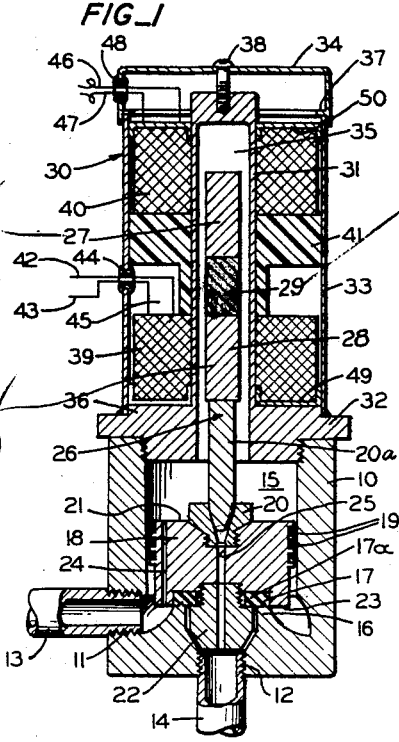
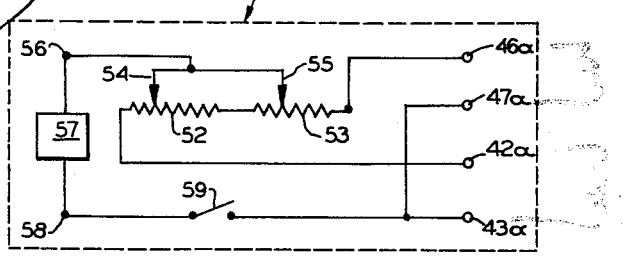
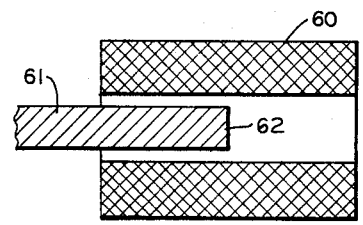
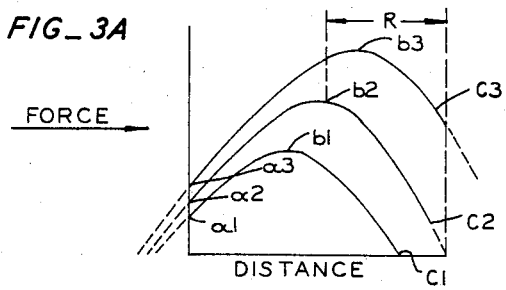
INVENTORS
MILTON A. BRENNER
WALTER M. FIEDLER
BY Robert Medwick
ATTORNEY

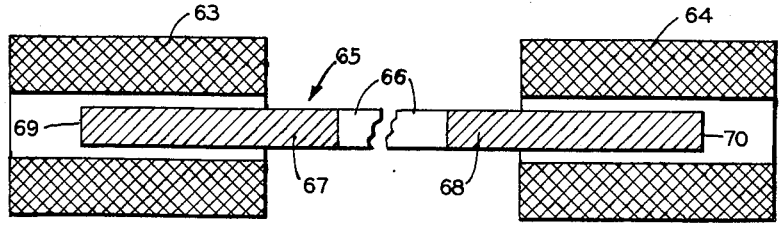
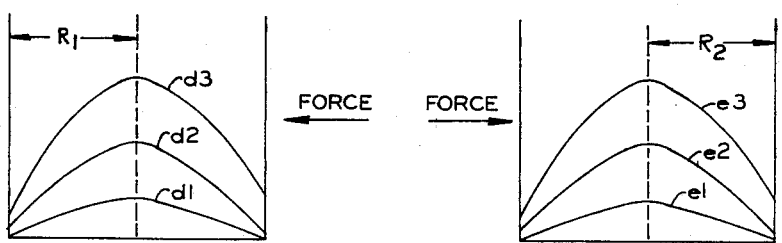
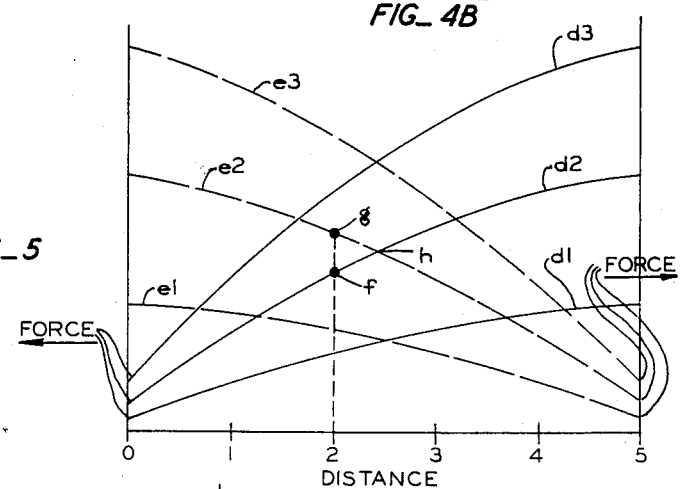
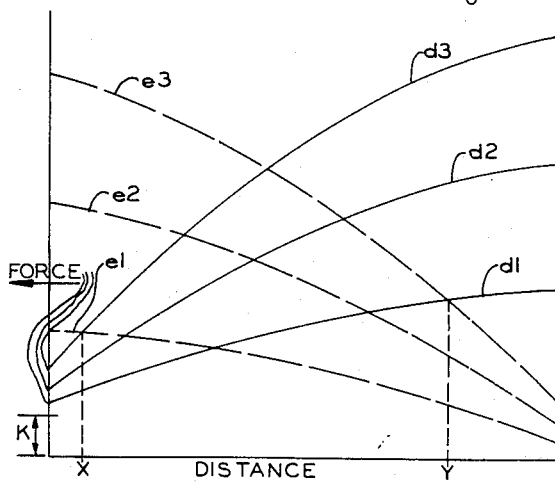

2,989,666
SELECTIVE CONTROL VALVE
Milton A. Brenner, Los Angeles, and Walter M. Fiedler, Buena Park, Calif., assignors of one-third to Robert Mednick
Continuation of application Ser. No. 514,172, June 9, 1955. This application Sept. 30, 1958, Ser. No. 764,429
5 Claims. (Cl. 317—123)

This invention relates to an electromagnetically operated device, and more particularly relates to an electromagnetically operated device having a movable member which may be selectively positioned.

In many instances, it is desirable to control the operation of a device at a remote distance from the device itself. An electromagnetically operated valve is an example of such a remotely operated device. This type of valve may have an electromagnetic solenoid or coil which upon being energized by the application of electrical current thereto will create an electromagnetic field which will attract and thereby move a movable member or armature. The armature will in turn position a fluid flow or passage control means such as a valve part for directly stopping or allowing the flow of fluid through the valve, or as in the piston operated valve the fluid flow control means also includes a piston valve to position the valve part for directly stopping or allowing the flow of fluid. For an example of a piston operated valve see U.S. Patent Number 1,633,217, issued to Littlefield on June 21, 1927.

In remote controlled devices such as the electromagnetically operated valves, it may be also desirable to vary the rate of fluid flow through the valve and to maintain a selected rate of fluid flow. The electromagnetically operated device of this invention has a movable member which may be selectively positioned by varying the strengths of electromagnetic fields. Accordingly, this device can be used in a valve to selectively position a fluid passage control means to vary the flow of fluid through the valve.

It is, therefore, an object of this invention to provide an electromagnetic device having a movable member which may be selectively positioned.

Another object of this invention is to provide an improved valve capable of being remotely controlled for regulating the rate of flow of fluid therethrough.

A further object of this invention is to provide a valve having a fluid passage control means which may be positioned by an electromagnetic device for selectively varying the rate of fluid therethrough.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIG. 1 is a cross-sectional view of a pilot operated valve embodying the invention.

FIG. 2 is a circuit diagram of a voltage means for varying the strengths of the electromagnetic means of the pilot operated valve of FIG. 1.

FIG. 3 shows in cross-section a solenoid or coil with an armature (shown in part).

FIG. 3a is a graph illustrating the force-distance characteristics due to the electromagnetic field produced by the solenoid of FIG. 3.

FIG. 4 shows in cross-section two spaced solenoids with a movable member having two sections of magnetic material.

FIG. 4a and FIG. 4b are graphs illustrating the force-distance characteristics of each of the two sections of magnetic material of the movable member due to the electromagnetic fields produced by the solenoids of FIG. 4.

FIG. 5 is a graph showing an enlargement of portions of FIGS. 4a and 4b superimposed on a single abscissa and illustrating the force-distance characteristics of the movable member due to the electromagnetic fields produced by the solenoids of FIG. 4.

FIG. 6 is a graph illustrating the force-distance characteristics of a movable member in an arrangement similar to FIG. 4 but including the effect of an additional force such as due to the weight of the movable member.

Referring now more particularly to the drawings there is shown in FIG. 1 a cross-sectional view of a pilot operated valve embodying the invention, said valve has a valve casing 10 with an inlet opening 11 and an outlet opening 12, both having threaded surfaces to engage similarly threaded inlet and outlet fluid conduits 13 and 14 respectively. Inlet opening 11 communicates with fluid chamber 15 within valve casing 10 which in turn communicates with outlet opening 12. Protruding section 16 of valve casing 10 has a circular raised portion 17 surrounding outlet opening 12.

The fluid passage control means comprise a piston 18 having circumferential piston rings 19 to prevent passage of fluid between the wall of fluid chamber 15 and piston 18, a pilot valve seat 20 threadably engaged in a similarly threaded recess in the center of upper face 21 of piston 18, and a main valve insert 22 similarly connected to lower face 23 of piston 18. In the body of piston 18 is a first orifice 24 extending vertically through 18 from lower face 23 to upper face 21, and a second orifice 25 shown to be parallel with first orifice 24 and located in the center of piston 18. Pilot valve seat 20 and main valve insert 22 have central orifices forming a continuation of second orifice 25. The portion of valve casing 10 that forms outlet opening 12 is shaped to receive in close fit main valve insert 22 when the valve is in closed position as seen in FIG. 1. On the lower face 23 of piston 18 is an annular ring 17a of relatively soft material such as hard rubber or the like which is connected to piston 18 by bolts, screws or the like. Circular raised portion 17 presses into annular ring 17a when the valve is in its closed position in order to insure no fluid flows into outlet opening 12.

Movable member or armature 26 is a cylindrical stem having a first section 27 and a second section 28, both made of material of high permeability such as soft iron, said first and second sections are separated by a third section 29 made of low magnetic permeability such as brass. All three sections are connected to form an integral unit. Connected to the end of second section 28 is a valve stem 20a shaped to closely fit in the recess in the center of pilot valve seat 20.

The housing generally designated as 30 is shown to comprise a valve stem guide 31 integral with a flanged base 32, a cylindrical body 33 and a cover 34 for cylindrical body 33. Valve stem guide 31 has a hollow core 35 forming an electromagnetic field chamber which is cylindrically shaped to freely receive movable member 26. Flanged base 32 has a threaded portion to engage valve casing 10 as seen in FIG. 1. Cylindrical body 33 fits over a shoulder 36 in flanged base 32 and is held in said position by extension 37 of cover 34 when cover 34 is fastened to valve stem guide 31 by screw 38. Cover 34, valve stem guide 31 and flanged base 32 are made of non-magnetic material, whereas cylindrical body 33 is made of magnetic material.

A first electrical solenoid or electromagnetic coil 39 and a second electromagnetic coil 40 is supported by housing 30 by any appropriate means, said coils surrounding the electromagnetic field chamber 35 in order to produce two electromagnetic fields within said chamber. The electromagnetic coils are separated by non-magnetic separator 41. Input wires 42 and 43 connect to first electrical solenoid 39 through hole 44 in cylindrical body 33 and through cutout 45 of separator 41. Input wires 46 and 47 connect to second electrical solenoid 40 through hole 48 in cover 34. In order to produce a greater magnetic field in electromagnetic field chamber 35 by providing a magnetic path of low reluctance, cover plates 49 and 50, made of high magnetic permeability material such as iron, are placed on the bottom and top of first and second electrical solenoids 39 and 40, respectively, as seen in the figure.

Referring now to FIG. 2, there is shown an example of a variable voltage source 51 for the valve of FIG. 1. Variable voltage source 51 is shown to comprise a pair of rheostats 52 and 53 connected in series at one end thereof, said rheostats having variable arms 54 and 55 electrically connected together and to terminal 56 of the constant source 57. The other ends of rheostats 52 and 53 connect to terminals 42a and 46a to which input wires 42 and 46 are connected. Terminal 58 connects to constant voltage source 57 and through a switch 59 to terminals 43a and 47a to which input wires 43 and 47 are connected.

The voltage applied to each of electromagnetic coils 39 and 40 depend upon the positioning of arms 54 and 55. Accordingly, by applying desired voltages to the electromagnetic coils then selected electromagnetic fields will be produced in the electromagnetic field chamber 35.

FIGURES 3 through 6 are shown in order to facilitate the understanding of the operation of the electromagnetic device of this invention. FIG. 3 shows in cross-section a means for producing an electromagnetic field, an electromagnetic coil 60, with a core or armature 61 (a part of its length is shown) made of magnetic material preferably of high permeability and negligible retentivity, e.g. soft iron. For a constant current applied to coil 60, the force-displacement diagram of FIGURE 3A shows the magnitude of the force exerted by the produced electromagnetic field on the core for the vertically corresponding position of end face 62 of core 61. Curves $a_1b_1c_1$, $a_2b_2c_2$, and $a_3b_3c_3$ represent the force-displacement characteristics for cores that are respectively shorter than, almost equal to, and longer than the solenoid. The direction of the force is such as to move the core within the coil. If the core moves within the coil from the left as seen in FIG. 3 the direction of the force on the core is to the right, conversely if the core moves within the coil from the right the direction of the force on the core is to the left. For further reference see Standard Handbook for Electrical Engineers, A. E. Knowlton, Editor in chief, eighth edition, published by McGraw-Hill Book Company, 1949, pages 492 to 494 (sections 5–39 to 5–50).

It is to be noted that although the direction of the force does not change when the cove moves toward its rest position within the coil (i.e. when the force is zero), the magnitude of the force increases to a maximum point and then decreases. For a given coil and core combination, the distance on the force-distance characteristics curve from the maximum point to the rest position where the magnitude of the force decreases in the direction of the force is herein defined as the force-declining region of the electromagnetic field produced by the coil. For example the force declining region of the coil of FIG. 3 having force-distance characteristics of curve $a_2b_2c_2$ extends from the dashed lines indicated by R.

Referring now to FIGURE 4 there is shown two similar coils 63 and 64 having a common armature or movable member 65 including a non magnetic section 66 connected to two cores or sections of magnetic material 67 and 68 shown to be of the same length as the coils. The force-distance characteristics curves for each coil-core combination is shown directly under the said combinations in FIGS 4A and 4B, where three curves are shown in each graph for three different representative electric currents applied to each coil. For a greater applied current the force of magnetic attraction is correspondingly increased. The force-declining regions of each combination approximately extends from the lines indicated by R1 and R2 in FIGS. 4A and 4B respectively. It is to be noted that the length of this movable member is seen to extend from the midpoints of the force-declining regions of both coils. Accordingly, as movable member 65 is moved from the position where core 67 is at its rest position, i.e. when end face 69 is approximately at the left end of coil 63, to the position where core 68 is at its rest position, i.e. when end face 70 is approximately at the right end of coil 64, both cores 67 and 68 are continuously and simultaneously within the force-declining regions R1 and R2 respectively.

FIG. 5 is an enlarged view of the force-declining region of the curves $d_1$, $d_2$, and $d_3$ in FIG. 4A, showing also thereon in dotted lines a similarly enlarged view of the force-declining region of the curves $e_1$, $e_2$, and $e_3$ in FIG. 4B wherein for any position of movable member 65, both sets of curves of FIG. 5 will show the magnitude of magnetic forces simultaneously exerted on both cores 67 and 68. For example, if the current applied to coils 63 and 64 result in force-distance characteristics curves $d_2$ and $e_2$ respectively, and if movable member 65 is in a position so that end face 69 is at distance 2 of FIG. 5, then point $f$ on curve $d_2$ represents the magnetic force exerted on core 67 tending to move the movable member to the left, and point $g$ on curve $e_2$ represents the magnetic force exerted on core 68 tending to move the movable member to the right. As the force on core 68 is larger than the force on core 67, the movable member will move to the right until point $h$ is reached, where oppositely directed electromagnetic forces are equal. Note that not only is this position $h$ the point of equilibrium for the movable member for the assumed conditions but this position is stable. If movable member 65 is displaced to the left of point $h$, then the force on core 68 being greater than the force on core 67 will move movable member 65 to the right toward the equilibrium position. Similarly if movable member 65 is displaced to the right of point $h$, then the force on core 67 to the left being greater than the force on core 68 to the right will then move the movable member to the left to equilibrium point $h$. Accordingly, it may be seen that for any given currents applied to coils 63 and 64 there will be one stable equilibrium position of movable member 65. Furthermore, by varying the currents, the stable equilibrium position of the movable member will be varied.

The electromagnetic device shown in FIG. 4 may have forces exerted thereon other than the electromagnetic forces. For example, in the valve of FIG. 1 embodying this invention the force of gravity due to the weight of the movable member will tend to move it downward or in the same direction as the electromagnetic field of coil 39. FIGURE 6 shows the same curves of FIG. 5 but the curves $d_1$, $d_2$ and $d_3$ are vertically displaced by the amount of an additional force K representing the weight of the movable member. The intersection of these curves will now show the stable equilibrium positions of the movable member including the effect of the weight of a movable member.

Considering now the operation of this electrically operated valve of FIG. 1, it is seen in this figure that the valve is in its closed position. As switch 59 is open, no voltage is applied to solenoids 39 and 40. Accordingly, no magnetic forces are generated by these solenoids and due to the gravitational force of its own weight movable member 26 will be in its lower position causing valve stem 20a to bear against pilot valve seat 20. Fluid from conduit 13 connected to inlet opening 11 will flow into and fill the portion of fluid chamber 15 below lower face 23 of piston 18. Due to the fluid pressure in the inlet conduit 13, the fluid will also flow through first orifice 24 and fill the portion of fluid chamber 15 above upper face 21 of piston 18. Fluid will be unable to freely flow from the portion of fluid chamber 15 above upper face 21 of piston 18 through second orifice 25 into outlet opening 12 because second orifice 25 is restricted by valve stem 20a. It is to be noted that a greater area of upper face 21 of piston 18 is in contact with the fluid than of lower face 23 of piston 18. As fluid pressure is constant throughout, a greater fluid force will be directed downward on upper face 21 of piston 18 than directed upward on lower face 23 of piston 18. Consequently, there will be a resultant fluid force directed downwardly on piston 18 forcing main valve insert 22 to bear against the portion of valve casing 10 that forms outlet opening 12 and thus prevent any fluid flow directly from inlet opening 11 to outlet opening 12. In this manner fluid pressure insures the closing of the valve.

If valve stem 20a is moved upwardly a small vertical distance, fluid in the upper portion of fluid chamber 15 will now flow through second orifice 25 into outlet opening 12. As second orifice 25 is larger in diameter than first orifice 24, the rate of flow of fluid out of fluid chamber 15 above piston 18 into outlet opening 12 will be greater than the rate of flow of fluid from inlet opening 11 into fluid chamber 15 above piston 18. The fluid pressure in fluid chamber 15 above piston 18 will continuously decrease causing a resultant upward force on lower face 23 of piston 18. The fluid pressure on lower face 23 of piston 18 corresponds to the fluid pressure in conduit 13 connected to inlet opening 11. The resultant upward force on piston 18 will force piston 18 to move upward until pilot valve seat 20 bears against valve stem 20a in its new position. The main valve is now open and fluid will flow directly from inlet opening 11 to outlet opening 12. However, as piston 18 has only moved a small vertical distance upwardly, then main valve insert 22 will not fully clear the portion of valve casing 10 surrounding outlet opening 12 and thus there is a restricted opening between inlet opening 11 and outlet opening 12. This restricted opening will only allow a low rate of fluid flow from inlet opening 11 to outlet opening 12.

Piston 18 will now remain in a position close to where its pilot valve seat 20 bears against valve stem 20a. The passage of fluid from fluid chamber 15 above piston 18 through second orifice 25 into outlet opening 12 will not be entirely prevented since there is some clearance between the lower portion of valve stem 20a and pilot valve seat 20. If the rate of flow of fluid into chamber 15 above piston 18 via first orifice 24 is greater than the rate of flow of the fluid from fluid chamber 15 into outlet opening 12 via second orifice 25, then piston 18 will be forced downwardly as previously described. If piston 18 is forced downwardly then second orifice 25 will be clear of the bottom portion of valve stem 20a allowing a greater flow of fluid through second orifice 25. When this occurs, then the fluid pressure will force piston 18 upwardly for the reason previously described. Accordingly, piston 18 will assume a position where the rate of flow of fluid through first orifice 24 will equal the rate of flow of fluid through second orifice 25.

From the foregoing, it will be realized that the position of piston 18 will depend upon the position of valve stem 20a and therefore that of movable member 26. The rate of fluid flow from inlet opening 11 into outlet opening 12 depends upon the clearance between main valve insert 22 and the portion of valve casing 10 surrounding outlet opening 12. Consequently, if the position of valve stem 20a is changed then the rate of fluid flow will be changed accordingly.

The position of valve stem 20a is controlled by the position of movable member 26 since they are connected to move with each other. The position of movable member 26 is controlled by the application of voltages to solenoids 39 and 40. With the valve closed as seen in FIG. 1, section 28 is positioned within the center of coil 39 in its rest position or a little further upward from its rest position, the rest position being where electromagnetic forces produced by voltages applied to coil 39 would not move section 28 if there are no other affecting forces. Section 27, on the other hand, is positioned so that electromagnetic forces produced by voltages applied to coil 40 is at a maximum or positioned a little further upwardly. It will now be realized that for the movable member 26 moving upwardly both sections 28 and 27 are at or near the beginning of the force-declining regions of the electromagnetic fields that coils 39 and 40 respectively will produce. FIG. 6 is indicative of the force-distance characteristics for this valve where K may represent the weight of movable member 26 and valve stem 20a, curves $d_1$, $d_2$, and $d_3$ may represent the electromagnetic forces produced by coil 39, curves $e_1$, $e_2$, and $e_3$ may represent the electromagnetic forces produced by coil 40, distance X may represent the position of movable member 26 when switch 59 is closed and variable arms 54 and 55 are at the extreme left position as seen in FIG. 2, and distance Y may represent the position of movable member 26 when variable arms 54 and 55 are at the extreme right.

In order to operate the valve, switch 59 is closed and variable arms 54 and 55 are moved from the extreme left position to the right as seen in FIGURE 2. A voltage is then applied to coil 40 producing a corresponding electromagnetic field resulting in a force on section 27 which will be greater than the combined force due to the electromagnetic field of coil 39 on section 28 and the weight of movable member 26 (and valve stem 20a). Section 27 will move toward the center of coil 40 and section 28 will move away from the center of coil 39. Accordingly, the upwardly directed force of the electromagnetic field produced by coil 40 on section 27 will decrease and the downwardly directed force of the electromagnetic field produced by coil 39 on section 28 will increase. Movable member 26 will move upwardly until the upwardly directed electromagnetic force is equal to the downwardly directed forces. If variable arms 54 and 55 are further moved to the right as seen in FIG. 2, movable member 26 will further move upwardly until the opposite directed forces are equal. Accordingly, it will be seen that by varying the applied voltages to coils 39 and 40 the position of movable member 26 will be correspondingly varied.

The circuitry shown in FIG. 2 which is connected to solenoids 39 and 40 is an example of many means known in the art for supplying variable selectable voltages. The position of arms 54 and 55 determine the amount of voltages applied to solenoids or coils 39 and 40.

Since the position of movable member 26 will determine the rate of fluid flow from inlet opening 11 to outlet opening 12, then appropriate application of voltages to solenoids 39 and 40 will control the rate of fluid flow through the valve. Accordingly, this invention can be used for remotely controlling and variably regulating the rate of flow of fluid through a valve.

This application is a continuation of copending application entitled "Selective Control Valve," Serial No. 514,172, filed on June 9, 1955, now abandoned.

Having herein described the invention, what is claimed as new is:

1. An electromagnetic device comprising: a first means to produce an electromagnetic field having a force-declining region in which the magnitude of the force of magnetic attraction decreases in the direction of the force; a second means to produce an electromagnetic field having a force-declining region in which the magnitude of the force of magnetic attraction decreases in the direction of the force; a movable member having a first section of magnetic material and a second section of magnetic material, said first and second sections being spaced from each other and being positioned to be simultaneously attracted by the electromagnetic fields in the force-declining regions of the said first and second means respectively, each field tending to move the movable member toward a different rest position, the movable member assuming an intermediate position depending on the strengths of the electromagnetic fields; and voltage means to simultaneously produce electromagnetic fields in each of said first and second means, and to vary the strengths of each of the electromagnetic fields of the first and second means to selectively position the movable member.

2. An electromagnetic device comprising: a first coil to produce an electromagnetic field having a force-declining region in which the magnitude of the force of magnetic attraction decreases in the direction of the force; a second coil to produce an electromagnetic field having a force-declining region in which the magnitude of the force of magnetic attraction decreases in the direction of the force; a movable member having a first section of magnetic material, a second section of magnetic material, and an intermediate section of non-magnetic material, said first and second sections being spaced from each other and being positioned to be simultaneously attracted by the electromagnetic fields in the force-declining regions of the said first and second coils respectively, each field tending to move the movable member toward a different rest position, the movable member assuming an intermediate position depending on the strengths of the electromagnetic fields; and voltage means to simultaneously produce electromagnetic fields in each of said first and second means, and to vary the strengths of each of the electromagnetic fields of the first and second coils to selectively position the movable member.

3. An electromagnetic device comprising: a first coil to produce an electromagnetic field having a force-declining region in which the magnitude of the force of magnetic attraction decreases in the direction of the force; a second coil to produce an electromagnetic field having a force-declining region in which the magnitude of the force of magnetic attraction decreases in the direction of the force; a movable member having a first section of magnetic material and a second section of magnetic material, said first and second sections being spaced from each other and being positioned to be simultaneously attracted by the electromagnetic fields in the force-declining regions of the said first and second coils respectively, each field tending to move the movable member toward an opposite rest position, the movable member assuming a position depending on the strengths of the electromagnetic fields; and voltage means to simultaneously produce electromagnetic fields in each of said first and second means, and to vary the strengths of each of the electromagnetic fields of the first and second coils to selectively position the movable member.

4. An electromagnetic device comprising: a plurality of coils to produce a plurality of electromagnetic fields, each field having a force-declining region in which the magnitude of the force of magnetic attraction decreases in the direction of the force; a movable member having a plurality of sections of magnetic material, each section being positioned to be attracted by an electromagnetic field in the force-declining region of a coil, each field tending to move the movable member toward a different rest position; and voltage means to simultaneously produce electromagnetic fields in each of said coils to vary the strengths of each of the electromagnetic fields to selectively position the movable member.

5. An electromagnetic device comprising: a first and a second electromagnetic coil; a voltage source connected to said first and second coils, each coil simultaneously producing an electromagnetic field having a force-declining region in which the magnitude of the force of magnetic attraction decreases in the direction of the force, said voltage source being capable of varying the voltage applied to said first and second coils; and a movable member having a first section and a second section of magnetic material being spaced from each other and being positioned to be simultaneously attracted by the electromagnetic fields in the force-declining regions of said first and second coils respectively, each field tending to move the movable member toward a different rest position, the movable member assuming an intermediate position depending on the strengths of the electromagnetic fields.

References Cited in the file of this patent

UNITED STATES PATENTS

| | | | |
|---|---|---|---|
| 2,020,833 | Hansen | Nov. 12, | 1935 |
| 2,102,400 | Wunche | Dec. 14, | 1937 |
| 2,251,441 | Dillman | Aug. 5, | 1941 |
| 2,322,911 | Beam | June 29, | 1943 |
| 2,496,553 | Littlefield | Feb. 7, | 1950 |
| 2,574,762 | Schell | Nov. 13, | 1951 |
| 2,579,723 | Best | Dec. 25, | 1951 |
| 2,620,133 | Obermaier | Dec. 2, | 1952 |
| 2,628,319 | Vang | Feb. 10, | 1953 |
| 2,727,715 | Tuthill | Dec. 20, | 1955 |

FOREIGN PATENTS

| | | | |
|---|---|---|---|
| 6,753 | Great Britain | June 3, | 1885 |
| 4,827 | Norway | Aug. 10, | 1896 |
| 106,600 | Austria | June 10, | 1927 |